April 5, 1966  S. WARNER  3,244,798
WELDED ELECTRICAL CONNECTION
Filed Aug. 1, 1963
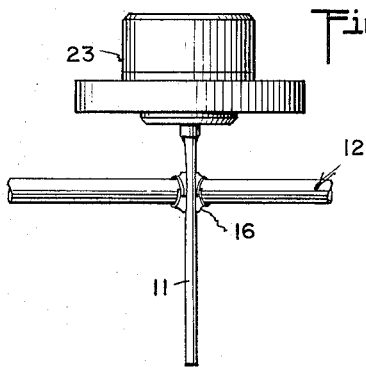
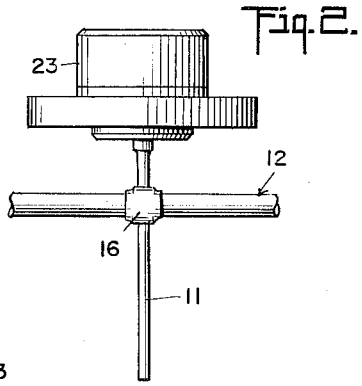
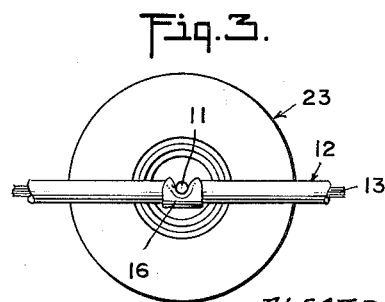
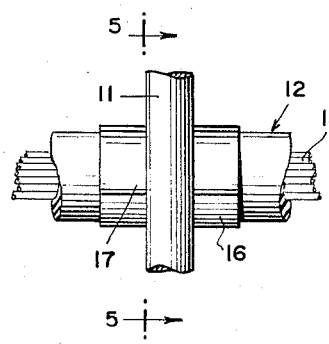
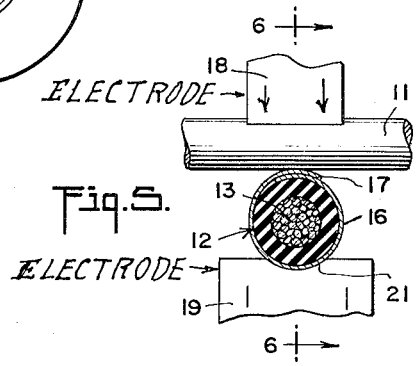
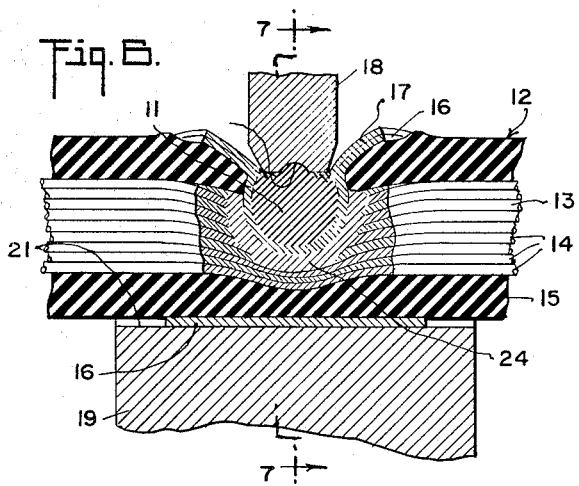
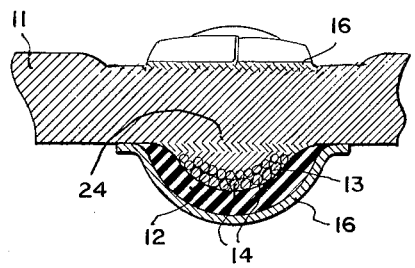
INVENTOR.
SAMUEL WARNER
BY
*Harry J. Bulook*
ATTORNEY United States Patent Office 3,244,798
Patented Apr. 5, 1966

3,244,798
WELDED ELECTRICAL CONNECTION
Samuel Warner, 1439 Highland Ave., Hillside, N.J.
Filed Aug. 1, 1963, Ser. No. 299,357
2 Claims. (Cl. 174—84)

This invention relates to welded electrical connections, the method of making such connections and, more particularly, to connections between bare and insulated conductors.

An object of my invention is to produce a welded electrical connection between an insulated conductor and a bare conductor, in which a conductive band is wound around the insulated conductor, the bare conductor during welding is fused through the insulation at the junction, carrying the adjacent portion of the band with it, and all three parts fused together, with the bare conductor and the intervening band portion also fused to the conductive body of the insulated conductor.

Another object of my invention is a welded electrical connection as above described, wherein the end portions of the band are overlapped, the overlapped end portions are forced through the insulation during welding and simultaneously welded together, the material of the band, where engaged by the bare conductor, being fused during the welding operation to add conductive material between the conductors.

A further object of my invention is to provide a method of welding a bare conductor to an insulated conductor, wherein a portion of the insulated conductor is wrapped with a conductive band, the bare conductor is placed in engagement with said band while it extends transversely of said insulated conductor, the engaged bare conductor and the band are disposed between a pair of electrodes, and an electrical welding current is passed between said electrodes while the electrodes are relatively moved toward each other to melt the insulation adjacent the bare conductor, so that the bare conductor and the adjacent portion of the band are fused into electrical contact with the conductive part of the insulated conductor, thereby welding all three parts together.

A still further object of my invention is a method as above described, wherein the conductive band has its end portions overlapped and the bare conductor engages said overlapped end portions, and the bottom electrode cradles the banded portion of the insulated conductor, to keep the insulation thereof from melting except at the top.

These and other objects and advantages will become apparent from the following detailed description when taken with the accompanying drawings. It will be understood that the drawings are for purposes of illustration and do not define the scope or limits of the invention, reference being had for the latter purpose to the appended claims.

In the drawings, wherein like reference characters denote like parts in the several views:

FIGURE 1 is a front elevational view of a welded electrical connection at the junction between an insulated conductor and a bare conductor.

FIGURE 2 is a rear elevational view of the connection of FIGURE 1.

FIGURE 3 is a bottom plan view of the welding connection of FIGURES 1 and 2.

FIGURE 4 is an enlarged fragmentary elevational view of the assembly of the parts as seen in FIGURE 1, preparatory to making the weld, but before the actual welding operation.

FIGURE 5 is a transverse sectional view on the line 5—5 of FIGURE 4 in the direction of the arrows, but with the parts turned 90° so that they are placed in a natural welding position.

FIGURE 6 is a further enlarged sectional view on the line 6—6 of FIGURE 5 in the direction of the arrows, but after the actual weld has been made and the parts fused together.

FIGURE 7 is a transverse sectional view on the line 7—7 of FIGURE 6, with the welding electrodes omitted, showing the parts which are fused during the welding operation.

Referring to the drawing in detail, there is shown a bare conductor 11 and an insulated conductor 12 that are to be welded together, so as to make a good electrical connection therebetween. The bare conductor 11 may be a single strand of copper, copper alloy or other durable metal of good conductivity. The insulated conductor, on the other hand, may be, and in the present instance is shown as, a stranded conductor 13. That is, it consists of a plurality of relatively small wires 14 of copper, copper alloy or other desirable metal of good conductivity providing the conductive part. It is surrounded by insulation 15, desirably of a plastic character.

The insulation 15 may consist of a plastic such as poly (tetrafluoroethylene), sold under the trademarks "Teflon" (Du Pont) or "Hypalon" (Kellogg), other similar materials such as "Mylar," or even rubber. In order to make the desired weld, the part of the insulated conductor 12 which is to be welded to the bare conductor 11, is enclosed by wrapping a band of conductive metal 16 thereabout. Desirably the end portions of said band are overlapped, as indicated at 17, with the overlapped portions at the top during the welding operation, as shown in FIGURE 5.

In order to effect the weld, the parts are assembled, as viewed in FIGURE 5, with the bare conductor 11 engaging the band 16 and in turn engaged by a relatively small electrode 18. The banded portion of the insulated conductor 12 is nested or cradled in the top part of a relatively large electrode 19, which for that purpose desirably has a cylindrical pocket 21 of a curvature generally corresponding with that of the band 16 when assembled. The upper or smaller electrode 18 may have a slight hollow cavity or depression 22, formed in the lower portion which engages the top of the bare conductor 11, as viewed most clearly in FIGURE 6.

Although in FIGURES 1, 2 and 3 the bare conductor is shown as supporting an electrical device in the form of a diode 23, such as are used in alternators for internal combustion engines, an example being those in automobiles yet this is merely illustrative and not limiting. It is also understood that, although only one such connection is illustrated, yet the insulated conductor 12 may have a plurality of such connections along a length thereof, spaced at desired distances, so that one electrode or pole of each of the electrical devices 23 is connected in parallel, or as desired, with one electrode or pole of one or more devices, along a length of the insulated conductor 12.

In the actual welding operation, the parts are first assembled as shown in FIGURE 5. That is, the lower electrode 19 supports the banded portion of the insulated conductor 12, the overlapping portions of the band 16 being on top and directly supporting the bare conductor 11. The upper electrode 18 rests on the top of the bare conductor 11, with an appropriate amount of force exerted. Then a suitable welding current is passed between the electrodes 18 and 19 through the bare and banded insulated conductors therebetween.

Initially, the bare conductor and band serve to conduct the welding current between the electrodes. The lower electrode 19, however, being relatively massive, not much heating occurs at the lower portion of the band 16, so that the heat is concentrated at the point of engagement between the bare conductor 11 and the overlapped end portions 17 of the band 16. Heat generated is transmitted to the upper portion of the insulation 15, which melts. Under the pressure between the electrodes, the bare conductor and upper portion of the band are forced from the position of FIGURE 5 to that of FIGURES 6 and 7, the band portion 16 and bare conductor 11, at the same time, penetrating the melted insulation and being used, as indicated at 24, directly to one another and to the, in this case, stranded, conductor portion 13 of the insulated conductor 12, with the insulation 15 and band portion 16 intact at the bottom or that part adjacent the larger electrode 19.

It will be seen from the figures that the band 16 not only functions to carry the current, but also to provide additional material at the weld to improve the conductivity between the two conductors at the junction therebetween. The relative proportions of the parts and the suggested composition thereof are illustrative rather than limiting.

Although a single embodiment has been illustrated and described, it will be understood that modifications may be made within the scope of the invention.

I claim:

1. A welded electrical connection at a junction between a bare conductor and an insulated conductor comprising an insulation-sheathed metallic conductive part, characterized by a conductive band encircling the insulated conductor and contacted exteriorly intermediate its edges by the bare conductor, the bare conductor and the adjacent portion of said band having been forced during welding through the melted insulation at the junction and into the metallic conductive part of the insulated conductor, and the bare conductor, said portion of the band and said metallic conductive part of the insulated conductor being fused together.

2. A welded electrical connection at a junction between a bare conductor and an insulated conductor comprising an insulation-sheathed metallic conductive part, characterized by a conductive band comprising a strip of conductive material wrapped around said insulated conductor with its ends overlapping each other and contacted intermediate the edges of the band by the bare conductor, the bare conductor and the overlapping end portions of the band having been forced during welding through the melted insulation at the junction and into the metallic conductive part of the insulated conductor, and the bare conductor, said portions of the band and said metallic conductive part of the insulated conductor being fused together.

References Cited by the Examiner

UNITED STATES PATENTS

| 2,250,156 | 7/1941 | Ferguson | 174—84 X |
| 2,820,843 | 1/1958 | Dreher | 174—71 X |
| 2,977,672 | 4/1961 | Telfer | 174—68.5 X |

LARAMIE E. ASKIN, Primary Examiner.

DARRELL L. CLAY, JOHN F. BURNS, Examiners.